(12) United States Patent
Sayano et al.

(10) Patent No.: US 9,850,581 B2
(45) Date of Patent: Dec. 26, 2017

(54) REACTOR INTERNAL STRUCTURE AND METHOD OF MANUFACTURING THE SAME

(71) Applicant: Kabushiki Kaisha Toshiba, Minato-ku (JP)

(72) Inventors: Akio Sayano, Yokohama (JP); Norihisa Saito, Yokohama (JP); Tetsuji Kaneko, Yokohama (JP); Yasuo Morishima, Yokohama (JP); Masato Okamura, Yokohama (JP); Kenji Yamazaki, Yokohama (JP); Kunihiko Kinugasa, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 91 days.

(21) Appl. No.: 15/048,227

(22) Filed: Feb. 19, 2016

(65) Prior Publication Data

US 2016/0194763 A1 Jul. 7, 2016

Related U.S. Application Data

(62) Division of application No. 13/139,424, filed as application No. PCT/JP2009/070705 on Dec. 10, 2009, now abandoned.

(30) Foreign Application Priority Data

Dec. 12, 2008 (JP) ................................. 2008-317128

(51) Int. Cl.
*C23C 30/00* (2006.01)
*C23C 18/12* (2006.01)
(Continued)

(52) U.S. Cl.
CPC ........ *C23C 30/005* (2013.01); *C23C 18/1216* (2013.01); *C23C 18/1241* (2013.01);
(Continued)

(58) Field of Classification Search
CPC .............. C23C 30/005; C23C 18/1216; C23C 18/1241
See application file for complete search history.

(56) References Cited

U.S. PATENT DOCUMENTS

| 4,973,526 A | 11/1990 | Haluska |
| 5,260,353 A | 11/1993 | Palmer |

(Continued)

FOREIGN PATENT DOCUMENTS

| EP | 0 442 632 A2 | 8/1991 |
| EP | 1 676 936 A2 | 7/2006 |

(Continued)

OTHER PUBLICATIONS

Yi et al "Coaxial Thin Film Transducers Based on PZT". IEEE 1989 Ultrasonics Symposium Proceedings Oct. 3-6, 1989, vol. 2, pp. 1231-1235.*

(Continued)

*Primary Examiner* — Nathan Empie
(74) *Attorney, Agent, or Firm* — Oblon, McClelland, Maier & Neustadt, L.L.P.

(57) ABSTRACT

A coating of niobium oxide, zirconium titanate, or nickel titanate is formed on at least a part of a surface of a jet pump member constituting a jet pump serving as a reactor internal structure of a boiling water reactor. Further, a solution containing, e.g., a niobium compound is applied to at least a part of the surface of the jet pump member constituting the jet pump, and the jet pump member coated with the solution is heat-treated to form a coating of, e.g., niobium oxide. With this configuration, the jet pump member constituting the jet pump of the boiling water reactor is provided such that deposition of crud can be sufficiently suppressed on the jet pump member.

4 Claims, 2 Drawing Sheets

(51) Int. Cl.
   C23C 26/00    (2006.01)
   F04F 5/10     (2006.01)
   F04F 5/46     (2006.01)
   G21C 15/25    (2006.01)
   G21C 19/307   (2006.01)
   G21C 1/08     (2006.01)
   G21C 17/022   (2006.01)

(52) U.S. Cl.
   CPC ........... *C23C 26/00* (2013.01); *F04F 5/10* (2013.01); *F04F 5/46* (2013.01); *G21C 1/084* (2013.01); *G21C 15/25* (2013.01); *G21C 19/307* (2013.01); *G21C 17/0225* (2013.01); *Y02E 30/31* (2013.01)

(56) References Cited

U.S. PATENT DOCUMENTS

| | | | |
|---|---|---|---|
| 5,290,354 | A | 3/1994 | Haluska |
| 5,444,747 | A | 8/1995 | Terhune |
| 6,633,623 | B2 | 10/2003 | Dulka et al. |
| 2005/0265512 | A1 | 12/2005 | Dulka et al. |
| 2007/0003001 | A1 | 1/2007 | Dulka et al. |
| 2010/0067643 | A1 | 3/2010 | Tan et al. |

FOREIGN PATENT DOCUMENTS

| | | | |
|---|---|---|---|
| JP | 59-078929 | | 5/1984 |
| JP | 2002-207094 | | 7/2002 |
| JP | 2004345922 | A * | 12/2004 |
| JP | 2005-049099 | | 2/2005 |
| JP | 2005-049161 | | 2/2005 |

OTHER PUBLICATIONS

International Search Report dated Jan. 19, 2010 in PCT/JP09/070705 filed Dec. 10, 2009.

English translation of an International Preliminary Report on Patentability and Written Opinion of the International Searching Authority dated Jul. 5, 2011, in Patent Application No. PCT/JP2009/070705.

Extended European Search Report dated Jul. 26, 2012, in European Patent Application No. 09831953.6.

* cited by examiner

REACTOR INTERNAL STRUCTURE AND METHOD OF MANUFACTURING THE SAME

CROSS-REFERENCE TO RELATED APPLICATIONS

This application is a division of and claims the benefit of priority under 35 U.S.C. §120 from U.S. Ser. No. 13/139,424 filed Jul. 7, 2011, the entire contents of which is incorporated herein by reference. U.S. Ser. No. 13/139,424 is a National Stage of PCT/JP09/070705 filed Dec. 10, 2009 which was not published under PCT Article 21(2) in English and claims the benefit of priority from Japanese Application No. 2008-317128 filed Dec. 12, 2008.

TECHNICAL FIELD

The present invention relates to a reactor internal structure constituting a boiling water reactor and a method of manufacturing the same, and particularly, to a reactor internal structure and a method of manufacturing the same which can suppress deposition of crud on the reactor internal structure.

BACKGROUND ART

In a boiling water reactor, a jet pump system is adopted to increase power density. The jet pump system forcibly circulates reactor coolant as cooling water and includes an external recirculating system and an internal recirculating system as systems for forcibly circulating reactor coolant through a core portion of a reactor pressure vessel.

The external recirculating system includes a plurality of jet pumps in a reactor pressure vessel and a recirculating pump outside the reactor pressure vessel. Cooling water fed from the recirculating pump is jetted by the jet pumps and reactor water around the jet pumps is drawn and forcibly fed into a core portion from a core bottom plenum disposed under the core portion, so that the reactor coolant is forcibly recirculated in the reactor pressure vessel.

FIG. 1 is a vertical cross-sectional view schematically showing a configuration of a boiling water reactor in which a jet pump system of the external recirculating system is adopted. A reactor pressure vessel 1 contains reactor coolant 2 and a core 3. The core 3 includes a plurality of fuel assemblies and control rods, not shown, and is housed in a core shroud 10.

The reactor coolant 2 passes through the core 3 upward and is simultaneously heated by nuclear reaction heat of the core 3 and then becomes a two-phase flow of water and steam. The coolant 2 in the two-phase state flow into a steam separator 4 installed above the core 3 and is separated into water and steam. The steam is introduced into a steam dryer 5 above the steam separator 4 to obtain dry steam, and the dry steam is transferred into a steam turbine, not shown, through a main steam line 6 and is used for power generation. A downcomer 7 between the core shroud 10 and the reactor pressure vessel 1 contains a plurality of jet pumps 11 spaced at regular intervals in a circumferential direction. The water separated by the steam separator 4 is pressurized through a recirculation system, not shown, is introduced into the jet pumps 11 from recirculation inlet nozzles 13, and flows under the core 3 through the jet pumps 11.

FIG. 2 is an enlarged perspective view showing a principle part of the jet pump 11 of FIG. 1. As shown in FIG. 2, the jet pump 11 includes a vertical riser tube 12 that introduces the coolant 2, which has been supplied from the recirculation inlet nozzle 13 of a recirculating pump, not shown, as an upward flow inside the reactor. The upper part of the riser tube 12 is connected to a pair of elbows 15 via a transition piece 14. The elbows 15 split the coolant into two downward flows. The elbows 15 are each connected to an inlet throat 17 via a mixing nozzle 16. The mixing nozzle 16 discharges the coolant 2 and surrounding reactor water is drawn with the coolant 2. The discharged coolant 2 and the drawn reactor water are mixed in the inlet throat 17. The inlet throats 17 are each connected to a diffuser 18 that feeds the coolant below the core. The elbow 15, the mixing nozzle 16, and the inlet throat 17 are integrated into a single unit called inlet mixer 51.

In the case of jet pumps constituting a boiling water reactor, unfortunately, crud of iron oxide in the reactor water is deposited and builds up on surfaces of jet pump members constituting the jet pump, which increases a pressure loss and reduces a flow rate, resulting in lower circulation efficiency. The components of the reactor internal structure provides like or similar problem. For example, crud (CRUD: Chalk River Unclassified Deposit) is considerably deposited and builds up on the jet pump members constituting the inlet mixer exposed to a high flow rate of hot water.

This matter has been dealt with at present by increasing the speeds of recirculating pumps (PLR pumps), which however has caused a large energy loss.

Further, although a water jet cleaning method has been also proposed to remove the deposited crud, this involves extremely high cost, thus being not practical.

Moreover, formation of a coating on surfaces of jet pump members has been proposed to suppress deposition of crud on reactor internal structures including the jet pump members. For example, in methods proposed in specifications of Japanese Patent Laid-Open No. 2002-207094 (Patent Document 1) and U.S. Pat. No. 6,633,623 (Patent Document 2), coatings of oxides including $TiO_2$, $ZrO_2$, $Ta_2O_5$, and $SiO_2$ are formed on surfaces of the jet pump members by a CVD (chemical vapor deposition) method or process. Further, in methods proposed in specifications of Japanese Patent Laid-Open No. 2007-10668 (Patent Document 3) and U.S. Patent Application Publication No. 2007/0003001 (Patent Document 4), coatings of platinum, rhodium, iridium, palladium, silver, and gold or metal alloys thereof are formed on surfaces of component parts such as jet pump members by methods or means of, e.g., plasma spray coating, HVOF, CVD, PVD, electroplating, and electroless plating.

As mentioned above, in reactor internal structures such as jet pumps of a boiling water reactor, the crud in reactor water is deposited and builds up on, e.g., surfaces of jet pump members constituting the reactor internal structures, which might increase a pressure loss and a flow rate, resulting in lower circulation efficiency. In order to improve this matter, it has been proposed, in a conventional technology, to form coatings on the surfaces of the jet pump members to thereby suppress adhesion of deposited crud such as disclosed in the related art (Patent Documents 1 to 4). In these proposals, however, deposition of crud cannot be sufficiently suppressed by forming the coatings. Moreover, the formation of the coatings requires an expensive apparatus, and size and shape of members to be coated are limited.

DISCLOSURE OF THE INVENTION

The present invention has been conceived to solve the defective matters described above, and an object of the present invention is to provide a reactor internal structure that can sufficiently suppress deposition of crud on a reactor internal structure of a boiling water reactor.

Another object of the present invention is to provide a method of inexpensively manufacturing a reactor internal structure that can sufficiently suppress deposition of crud with a simple manufacturing process and is applicable to a complexly shaped member or a large-sized member.

The inventors of the present invention have earnestly studied suppression of deposition of crud on a reactor internal structure of a boiling water reactor, and as a result, the inventors found that deposition of crud can be suppressed by forming a coating of niobium oxide, zirconium titanate, or nickel titanate and also found that a high-quality coating of niobium oxide, zirconium titanate, or nickel titanate can be inexpensively formed by so-called chemical solution deposition including the steps of: applying a solution containing a compound of these metals to the surface of the reactor internal structure; and forming a coating by heat-treating the reactor internal structure coated with these solutions. Thus, the present invention has been completed.

A reactor internal structure according to the present invention is a reactor internal structure constituting a boiling water reactor, the reactor internal structure having a surface at least partially coated with niobium oxide, zirconium titanate, or nickel titanate.

A method of manufacturing the reactor internal structure according to the present invention includes the steps of: applying a solution containing a niobium compound to at least a part of a surface of the reactor internal structure constituting the boiling water reactor; and forming a coating of niobium oxide by heat-treating the surface of the reactor internal structure coated with the solution.

A method of manufacturing a reactor internal structure according to the present invention includes the steps of: applying a titanium-zirconium compound solution to at least a part of a surface of the reactor internal structure constituting a boiling water reactor; and forming a coating of zirconium titanate by heat-treating the surface of the reactor internal structure coated with the solution.

A method of manufacturing a reactor internal structure according to the present invention includes the steps of: applying a titanium-nickel compound solution to at least a part of a surface of the reactor internal structure constituting a boiling water reactor; and forming a coating of nickel titanate by heat-treating the surface of the reactor internal structure coated with the solution.

According to the present invention, it is possible to suppress deposition and buildup of crud on a surface of the member of the reactor internal structure constituting the boiling water reactor, thereby keeping initial performance of coolant passing through the reactor. Moreover, according to the manufacturing method of the present invention, the reactor internal structure capable of sufficiently suppressing deposition of crud can be manufactured with a simple manufacturing process at low manufacturing cost.

BEST MODE FOR CARRYING OUT THE INVENTION

Figure 1:
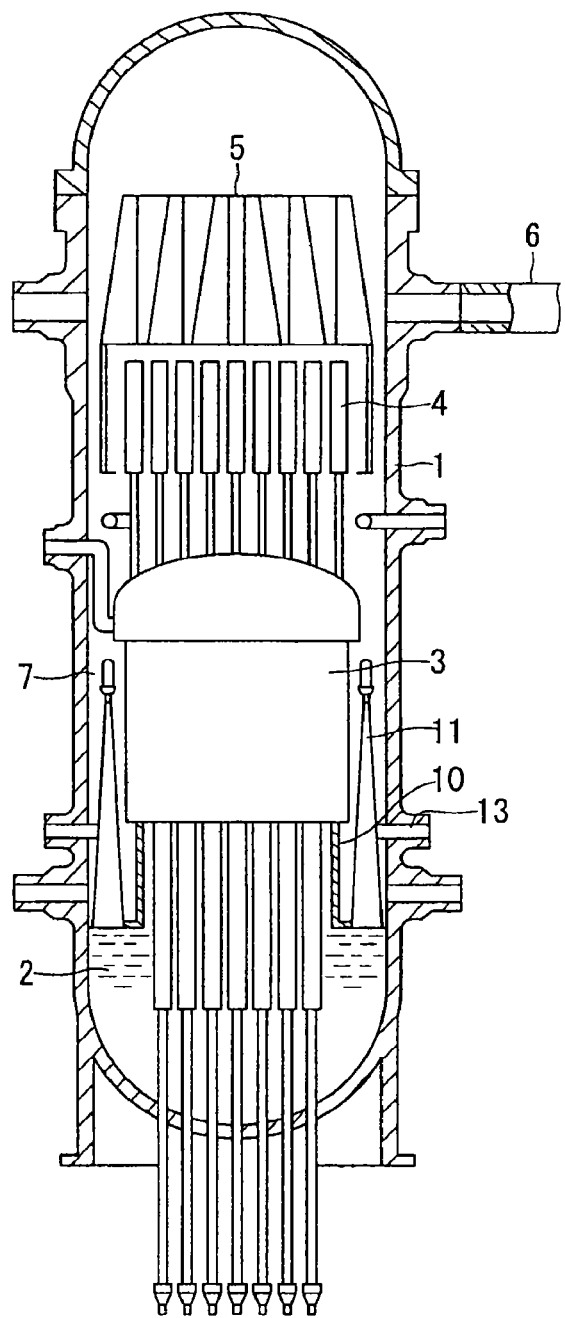
FIG. 1 is a vertical cross-sectional view schematically showing a configuration of a boiling water reactor in which a jet pump system of an external recirculating system is adopted.

In the following, there will be described an example in which an embodiment of the present invention is applied to a jet pump serving as a reactor internal structure of a boiling water reactor. In the present disclosure, terms representing directions, such as "upper", "lower", "right", "left" and so on, represent directions are used with reference to the illustration in the drawings or in an actual installation state of the reactor.

As described above, FIG. 2 is an enlarged perspective view showing an essential portion of a jet pump 11 of the boiling water reactor. In order to suppress deposition of crud on the jet pump 11, a coating of niobium oxide, zirconium titanate, or nickel titanate is formed on at least a part of a surface of a jet pump member constituting the jet pump 11, particularly, on a portion having much deposition of crud. Thus, it is possible to suppress the deposition and the build-up of the crud in the reactor water on the surface of the jet pump member, thereby keeping initial performance of the jet pump 11 for an extended period.

Although the deposition and build-up of the crud on the surface of the jet pump member can be suppressed by forming the coating, it is not clear whether such effects can be achieved by every mechanism or not, and the mechanism is assumed as follows.

First, a coating of niobium oxide, zirconium titanate, or nickel titanate is formed on at least a part of the surface of the jet pump member, so that the surface of the jet pump member has a negative surface potential. Meanwhile, iron oxides such as hematite ($Fe_2O_3$) and magnetite ($Fe_3O_4$) in the crud in the reactor water also have a negative surface potential, so that it is expected that an electrical repulsive force is generated between the surface of the jet pump member and the crud in the reactor water, and the deposition and build-up of the crud can be suppressed on the surface of the jet pump member.

The coating of niobium oxide, zirconium titanate, or nickel titanate is stabilized and is not melted in reactor water of an actual nuclear power plant, and moreover, oxidation resistance of a metal substrate is expected to improve in addition to the suppression of the deposition and buildup of the crud. Moreover, a coating having high adhesive strength to the metal substrate can be formed by so-called chemical solution deposition.

It is preferred that the coating has a thickness of 0.01 μm to 10 μm. The thickness of the coating is set at 0.01 μm to 10 μm for the following reason:

That is, in the case where the thickness of the coating is smaller than 0.01 μm, the coating cannot evenly cover the substrate and the substrate is partially exposed, so that the oxidation resistance of the substrate rapidly decreases. On the other hand, in the case where the thickness of the coating is larger than 10 μm, the adhesive strength of the coating to the substrate decreases, so that cracks may occur on the coating, the substrate becomes less resistant to oxidation, and the coating may be peeled off from the substrate.

Figure 2:
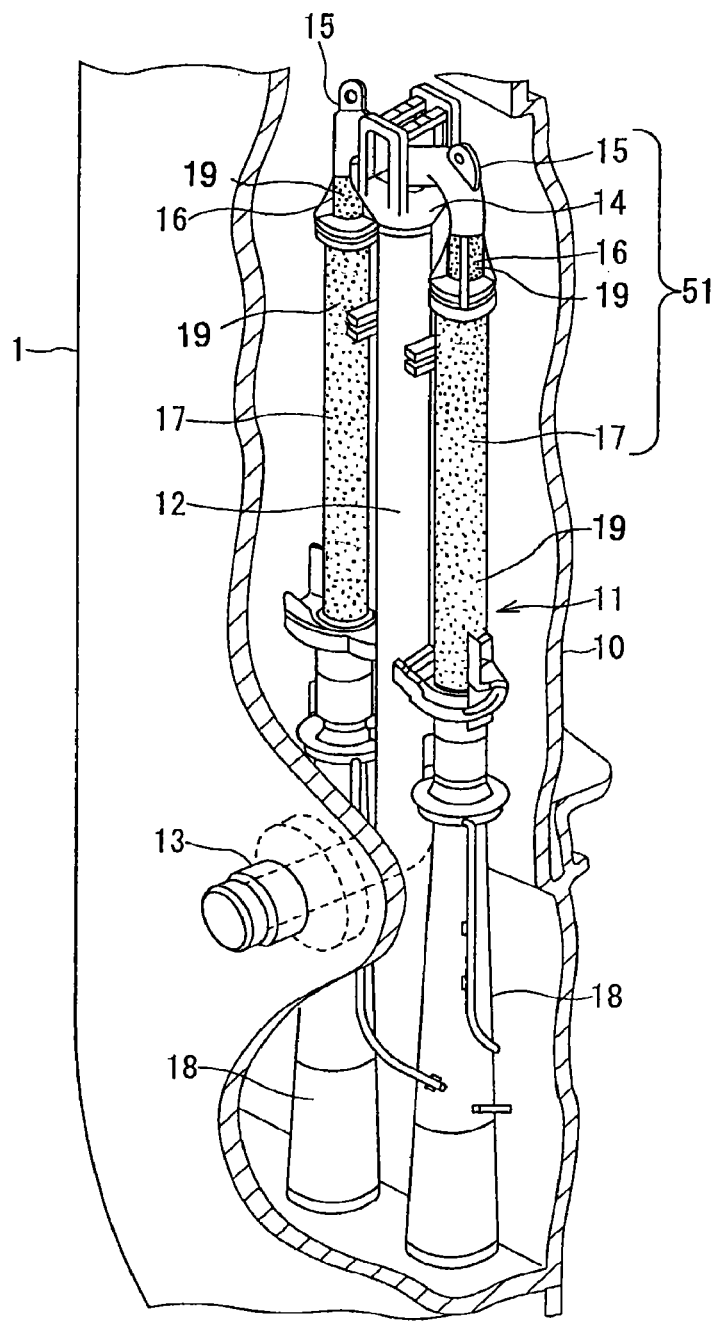
FIG. 2 is an enlarged perspective view showing an essential part of a jet pump 11 of FIG. 1.

In an actual nuclear power plant, the crud to the jet pump is considerably deposited and builds up on an inner surface of an inlet mixer 51 that is exposed to a high flow rate of hot water. Accordingly, the formation of the coating is particularly effective on the inner surfaces of the jet pump members constituting the inlet mixer 51, for example, a mixing nozzle 16 and an inlet throat 17. FIG. 2 schematically shows the coating 19 formed on the inner surface of the mixing nozzle 16 and on the inner surface of inlet throat 17.

Hereunder, a method of manufacturing the jet pump members according to the present invention will be described.

In order to form the coating on the surfaces of the jet pump members, first, a solution containing a niobium compound, a titanium-zirconium compound solution, or a titanium-nickel compound solution is applied to the surfaces of the jet pump members. Next, the jet pump members coated with these solutions are heat-treated to form a coating of niobium oxide, zirconium titanate, or nickel titanate.

In this case, the solution containing the niobium compound, the titanium-zirconium compound solution, or the titanium-nickel compound solution is, for example, a solution containing a complex of these metallic elements, a solution containing an alkoxide compound of these metallic elements, a solution containing salts of these metallic elements, and zol generated by hydrolysis on compounds of these metallic elements.

Solvents of these solutions include water, alcohols such as butanol and isopropyl alcohol, other organic solvents, and mixtures of these solvents.

The complex, the alkoxide compound, and the salts of these metallic elements are not particularly limited as long as the complex, the alkoxide compound, and the salts are soluble in the solvents. The compounds of metallic elements for generating the zol by hydrolysis include alkoxide compounds and salts. The compounds are not particularly limited as long as the compounds are soluble in the solvents.

These solutions are applied to the surfaces of the jet pump members by, for example, dipping, spraying, spin-coating, roll-coating, bar-coating and the like method. Optimal one of the methods may be adopted according to dimensions and shapes of the jet pump members to be coated.

Subsequently, the jet pump members coated with the solutions are heat-treated. The jet pump members coated with the solutions may be kept in an electric furnace and then entirely heated. Alternatively, only the surfaces of the jet pump members may be heated by infrared radiation or any other radiation. The heating method is not particularly limited to such heating methods, and other known heating methods may be used instead.

The jet pump members are preferably heat-treated at 80° C. to 600° C. A heat-treatment temperature lower than 80° C. causes problems such as insufficient thermolysis of a niobium compound, a rough coating, and an unstable coating leading to aging and exfoliation. On the other hand, a heat-treatment temperature higher than 600° C. changes a structure of a metal serving as a substrate of the jet pump member, thereby deteriorating properties such as fatigue strength and creep strength. A heat-treatment atmosphere contains oxygen in air.

The coating of niobium oxide, zirconium titanate, or nickel titanate is formed by the heat treatment on the surfaces of the jet pump members.

The method of manufacturing the jet pump members according to the present invention is so-called chemical solution deposition which is a highly practical method inexpensively applicable to large jet pump members or complexly shaped jet pump members with a simple process without the need for an expensive apparatus. Another advantage of the manufacturing method is that a coating can be evenly formed and surface roughness of the jet pump members hardly changes in a coating operation, thereby eliminating the need for processing after the coating operation.

In this example, although the present embodiment is applied to the jet pump, the present embodiment may be applied to reactor internal structures including an inner surface of a core shroud, a stand pipe of a steam separator, and a corrugated plate of a steam dryer. Further, in this case, substantially the same effects are obtainable as those attained by the described embodiment.

First Example

As a test piece, there was prepared SUS304L stainless steel worked into a rectangular test piece of 40 mm×5 mm×1 mm.

A 5-wt % butanol solution of niobium alkoxide was applied to a surface of the test piece by dipping and then the test piece was heat-treated at 400° C. in atmosphere for ten minutes to form a coating. This process was repeated three times to adjust a thickness of the coating.

The coating formed on the surface of the test piece had a thickness of about 1 μm and contained amorphous niobium oxide.

A crud deposition characteristic test that was a simulation of an actual nuclear power plant was performed to the test piece having the coating.

In the crud deposition characteristic test, the test piece is immersed and contained in water at 280° C. and 7 MPa and is kept therein for 300 hours. The water contains crud of 60 ppm which is obtained by mixing hematite ($Fe_2O_3$) and magnetite ($Fe_3O_4$) in a ratio of 1 to 1. A crud deposition characteristic is evaluated by measuring a change in a weight of the test piece before and after the test.

The test piece including the coating of amorphous niobium oxide formed with a thickness of about 1 μm hardly varied in weight before and after the test.

Second Example

A coating was formed by the same method under the same conditions as in the first example except for use of an isopropyl alcohol solution containing 5 wt % of titanium-zirconium alkoxide in a one-to-one atomic ratio of titanium to zirconium. The coating formed on a test piece contained amorphous zirconium titanate.

The test piece having the coating of zirconium titanate underwent a crud deposition characteristic test by the same method as in the first example. As a result, the test piece hardly varied in weight before and after the test.

Third Example

A coating was formed by the same method under the same conditions as in the first example except for use of a butanol solution containing 5 wt % of titanium-nickel alkoxide in a one-to-one atomic ratio of titanium to nickel. The coating formed on a test piece contained amorphous nickel titanate.

The test piece having the coating of nickel titanate underwent a crud deposition characteristic test by the same method as in the first example. As a result, the test piece hardly varied in weight before and after the test.

First Comparative Example

In a first comparative example, a crud deposition characteristic test was performed to an uncoated test piece of a SUS304L substrate by the same method as in the first example. As a result, large crud deposition was observed on a surface of the test piece by a visual check or microscopy and a considerable weight gain was recognized.

As described above, it was confirmed that in the case where the reactor internal structures including the jet pump members of the foregoing examples are coated with niobium oxide, zirconium titanate, or nickel titanate, deposition of crud can be effectively suppressed. Further, in the method of manufacturing the reactor internal structures including the jet pump members of the foregoing examples, a high-quality coating can be inexpensively formed by chemical solution deposition regardless of a shape and size of the reactor internal structure.

According to the present invention, it is therefore possible to suppress an increase in a pressure loss of a channel of a reactor internal structure, e.g., a jet pump of a boiling reactor, and to hence stably maintain initial performance for an extended period, thereby remarkably contributing to safety of nuclear power plants.

The invention claimed is:

1. A method of manufacturing a reactor internal structure, comprising the steps of:
    applying a titanium-zirconium compound solution to at least a part of a surface of the reactor internal structure constituting a boiling water reactor, the part being exposed to a reactor water; and
    forming a coating of amorphous zirconium titanate by heat-treating the exposed part of the surface of the reactor internal structure coated with the solution, so that the surface of the reactor internal structure has a negative surface potential.

2. The method of manufacturing a reactor internal structure according to claim 1, wherein the titanium-zirconium compound solution has a one-to-one atomic ratio of titanium to zirconium.

3. The method of manufacturing a reactor internal structure according to claim 1, wherein the heat treatment is performed at 80° C. to 600° C.

4. The method of manufacturing a reactor internal structure according to claim 1, wherein the coating has a thickness of 0.01 μm to 10 μm.

* * * * *